Patented Aug. 15, 1950

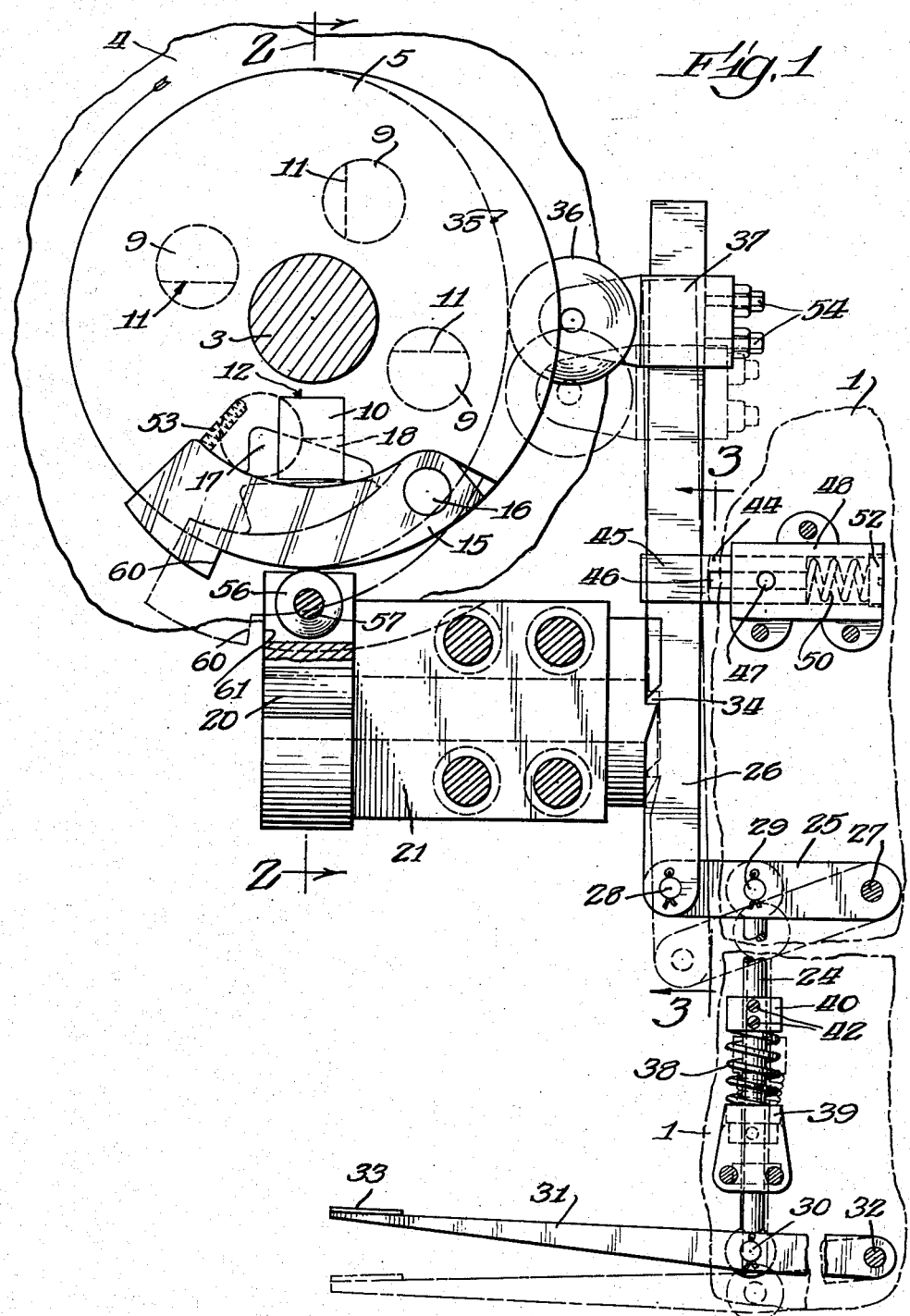

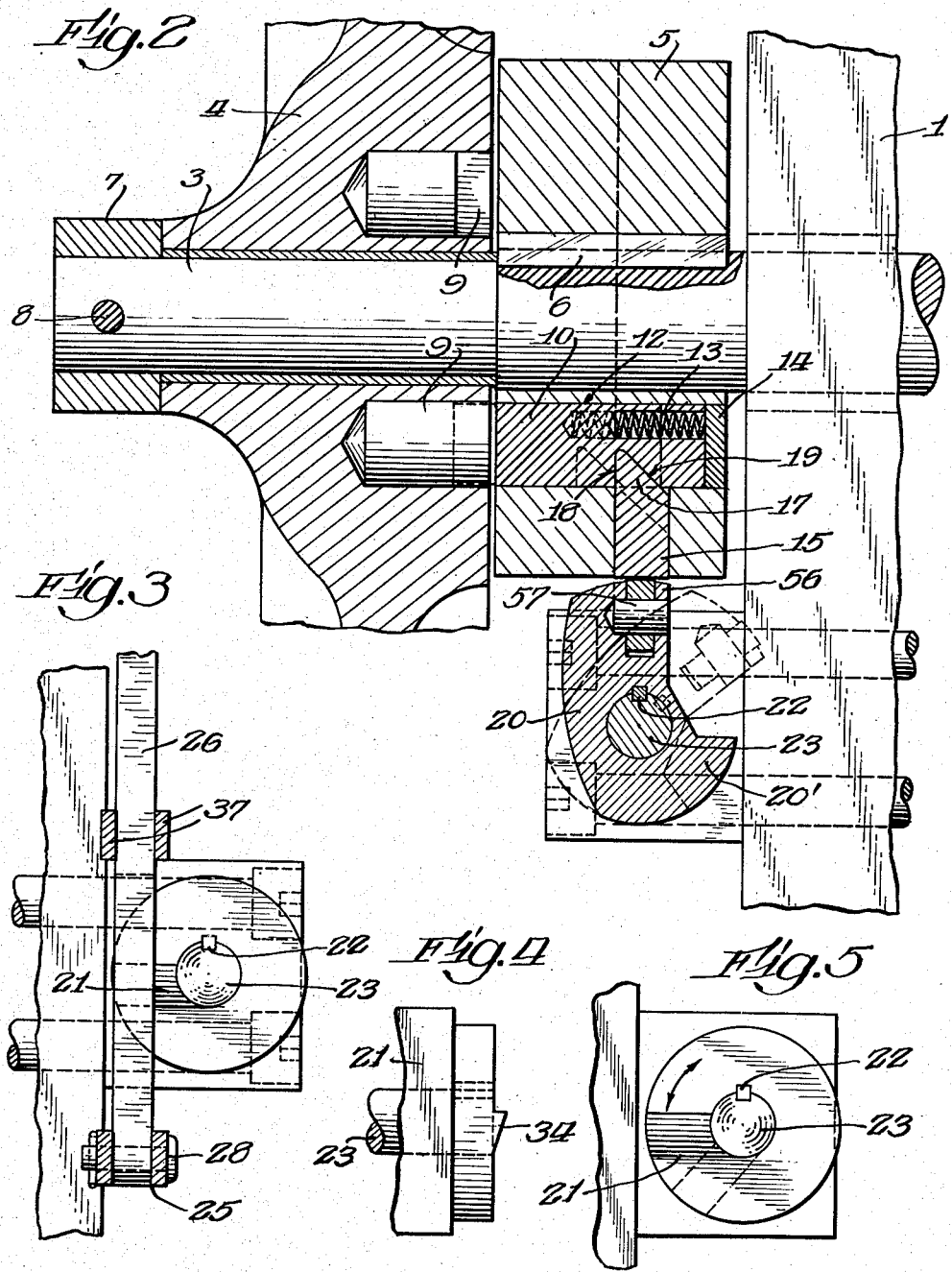

2,518,492

UNITED STATES PATENT OFFICE 2,518,492

SAFETY TRIP MECHANISM

Kenneth E. Reese, Elkhart, Ind.

Application March 11, 1947, Serial No. 733,863

10 Claims. (Cl. 192—25)

This invention relates, in general, to punch presses, and has particular relation to an improved safety trip mechanism therefor.

While I have referred to the invention as a safety trip mechanism for punch presses and shall hereinafter, in connection with the drawings, describe the invention in that regard, it is to be understood that the device of the present invention may be employed for all similar purposes; for example, wherever a safety trip mechanism is desired.

Prior devices of the sort with which the present invention is concerned usually embody a continuously rotating power member, such as a flywheel, a rotatable crank shaft, cooperating clutch elements between the power member and the crank shaft adapted to be moved into and out of clutching engagement to cause intermittent rotation of the crank shaft to be produced during continuous rotation of the power member, and a hand or foot lever for controlling engagement of the clutch elements.

One of the main objects of the present invention is to provide an improved safety trip mechanism which will operate automatically as a safety device to disengage the clutch elements at the end of each cycle of operation of the machine.

Another object of the invention is to provide an improved form of safety trip mechanism in which the release member, by travelling with the driven clutch member at all times, does not have to depend on the driven clutch member dropping back into position to retract it from the flywheel or other driving member as usual in the prior conventional forms of safety trips.

Another object of the invention is to provide a safety trip mechanism having an additional safety feature operable in the event any part is sprung or broken to cause belt slippage or stalling of the operating power, thereby avoiding possible accident and possible injury to the operator.

Another object of the invention is to provide a safety trip mechanism that may be set expeditiously and with facility for either non-repeat or continuous operation selectively as desired.

Another object of the invention is to provide a device of the class described having various features of novelty and advantages, and which is particularly characterized by its simplicity in construction, its economy in manufacture, its effectiveness in use, and the ease and assurance with which it operates for the intended purpose.

Another object of the invention is to provide a device of the class described wherein excessive wear is eliminated.

Another object of the invention is to provide an improved form of safety trip mechanism in which the release member is pivoted for swinging movement in a plane disposed transversely with respect to the axis of the crank shaft and about an axis parallel with the axis of the crank shaft.

Further objects and advantages of the invention will appear from the following detailed description, taken in connection with the accompanying drawings which illustrate the manner of constructing and operating an illustrative embodiment of the present invention.

In the drawings:

Figure 1 is a fragmentary side elevational view of a safety trip mechanism embodying the present invention;

Figure 2 is a fragmentary vertical sectional view taken substantially on the line 2—2 of Figure 1;

Figure 3 is a fragmentary vertical sectional view taken substantially on the line 3—3 of Figure 1;

Figure 4 is a fragmentary detail elevation of the end of the ratchet plate which has the ratchet tooth or step for engagement with the cooperating ratchet tooth or step on the release rod; and Figure 5 is an end view of the ratchet plate member.

Referring now to the drawings, the part shown fragmentarily at 1 in Figure 2 may be the frame of the punch press or other machine or apparatus with which the safety trip mechanism of the present invention is used. A horizontal crank shaft 3 for the press is journaled in the frame and has a driving wheel 4, such as a belt or motor operated flywheel, pulley, gear or the like mounted on the outer end of the shaft 3. The flywheel 4 is normally free to rotate on the shaft 3.

A driven clutch block 5 is fixed on the shaft 3 for rotation therewith, for example, by a key, spline or the like indicated at 6. Brake means (not shown) is preferably provided as suitable or desired.

The hub of the flywheel 4 is confined between the block 5 and a suitable retaining member 7 secured at 8, preferably detachably, to the outer end of the shaft 3. The inner end of the hub of the flywheel 4 has a plurality of driving clutch elements, for example, in the form of pins 9 secured thereto with their inner ends adapted for engagement with a driven clutch element, for example, in the form of a bolt 10 carried for longitudinal sliding movement in the driven clutch block 5. Four driving clutch elements 9, equispaced circumferentially about the hub of the flywheel, are shown in the drawings, but this may vary within the scope of the present invention. The driving clutch elements 9 are shown of cylindrical form with flat surfaces 11 for engagement with the driven clutch element or bolt 10, but this, too, may vary.

The bolt 10, which is shown of generally rectangular form in transverse section, is mounted for longitudinal sliding movement in a recess 12 of corresponding form in the block 5. A coil spring 13, positioned within a recess in the bolt 10 and engaging at its outer end against an abutment 14 secured to the block 5 operates when the bolt 10 is released to force the bolt into position for engagement by one of the pins 9. With the flywheel 4 rotating in a counterclockwise direction as shown by the arrow in Figure 1, one or the other of the clutch pins 9 engages the projecting end of the bolt 10 and drives or rotates the shaft 3 with the flywheel 4.

The driven clutch element or bolt 10 is retractable from clutching position by a release lever 15 pivoted at 16 to the driven member or block 5. The lever 15 has a tapered or angular part 17 which, when the lever is forced upwardly from its dotted line position to its full line position as shown in Figure 1, enters a slot 18 in the bolt 10 and, by cooperation with the tapered or angular side 19 of the slot, cams the bolt 10 out of engagement with the cooperating drive pin 9. The release lever 15, by travelling with the bolt 10 at all times, does not have to depend on the bolt 10 dropping back into position to retract it from the flywheel as usual in the prior conventional forms of safety trips.

For the purpose of swinging the lever 15 upwardly to retract the bolt 10, a cam actuator 20 is carried by the adjacent end of a ratchet plate 21. The plate 21 is splined or keyed, for example, at 22 on a shaft 23. This shaft 23 may be suitably journaled for rotation so that the plate 21 and cam actuator 20 may turn about the axis of the shaft. The cam actuator 20 has a balance weight 20' which turns the cam actuator back to its vertical position shown in full lines in Figure 2 following movement of the cam actuator to its dotted line position.

By depressing a trip rod 24 which works in conjunction with a trip arm 25 a release rod 26 is pulled downwardly. The arm 25 is shown pivoted at one end at 27 to the frame 1 of the press and, at its opposite end, at 28 to the lower end of the release rod 26. The trip rod 24 is pivoted at its upper end at 29 to the arm 25 between the pivots 27 and 28 and, at its lower end, for example, at 30 to a foot pedal 31. The pedal 31 is pivoted at one end at 32 to the frame 1, and is adapted to be engaged and depressed at its opposite end at 33 by the foot of the operator.

The release rod 26 has a ratchet tooth or step which engages at 34 with a ratchet tooth or step on the ratchet plate 21. With the parts positioned as shown in full lines in Figures 1 and 2 and the ratchet teeth or steps in engagement at 34, the plate 21 is swung from its full line position to its dotted line position (Figure 2) when the trip rod 24 is depressed. This is accomplished by turning movement imparted to the plate 21 about the axis of the shaft 23 by the tooth or step engagement at 34. The release lever 15 then drops out of the slot 18 in the bolt 10 and the spring 13 forces the bolt 10 to the left, as the parts are shown in Figure 2, for engagement with the drive pins 9 on the flywheel 4.

With the flywheel 4 in motion, the engagement of one of the pins 9 with the bolt 10 drives the crank shaft 3 in a counterclockwise direction until a cam surface 35 on the block 5, by engagement with a roller 36 journaled to turn on the adjacent end of a release dog, forces the release rod 26 in a clockwise or backward direction about its pivot 28. This releases the ratchet tooth or step engagement at 34 between the release rod 26 and the ratchet plate 21, and the cam actuator 20 turns back to its vertical position (Figure 2) under the action of the balance weight 20'.

The cam actuator 20 has a radius on its outer or back side which then comes into contact with the release lever 15 and forces it upwardly from its dotted line position to its full line position (Figure 1). In swinging upwardly the angular part 17 of the lever 15 enters the slot 18 and forces or cams the bolt 10 out of engagement with the cooperating drive pin 9. The release rod 26 is brought back to its full line position from its dotted line position as shown in Figure 1 by a coil spring 38 encircling the rod 24 and interposed between and acting against a bracket 39 which is secured to the frame 1, and an adjusting abutment collar 40 adjustable along the rod 24. The proper tension is obtained by adjustment of the collar 40 up and down on the rod 24. The collar 40 is held in place after adjustment is made by set screws 42 which lock against the rod 24.

With the foot pedal 31 released, the tension of the spring 38 is adapted to force the release rod 26 in an upward direction until the ratchet tooth or step thereon is brought into engagement with the ratchet tooth or step on the plate 21 by a guide plunger 44. The plunger 44 has a slot 45 which fits the sides of the rod 26 and a horizontal slot 46 in which a guide pin 47 anchored in a guide pin housing 48 engages. Pressure to force the guide plunger 44 against the release rod 26 is obtained by a coil spring 50 engaged in the guide pin housing 48. Proper tension is obtained by adjustment of a screw 50' in the guide pin housing 48.

If desired, spring means may be provided for helping to force the release lever 15 out of engagement with the slot 18 in the bolt 10 when the ratchet plate 21 is swung out from beneath the lever 15. An example of this is shown in the form of a coil spring 53 mounted in a recess in the block 5 and acting against the lever 15.

The release dog 37 is preferably detachably mounted on the upper end of the rod 26. As shown in Figure 1, the dog 37 may be secured in place on the rod 26 by set screws 54, or in any other suitable or preferred manner. With the dog 37 and its roller 36 in place, the crank shaft 3 makes one revolution and stops. It does not repeat until the foot pedal 31 has moved upwardly and is again depressed. The device may be made to operate continuously by the simple expedient of removing the release dog 37 and holding the pedal 31 or rod 26 depressed. Other cycles of operation are also contemplated within the scope of the broader aspects of the present invention.

In order to eliminate excessive wear, the engagement between the cam actuator 20 and the release lever 15 is preferably accomplished through a roller 56. This roller 56 is journaled for rotation at 57 on the cam actuator 20 and engages the bottom of the lever 15. The roller 36 on the release dog 37 also eliminates excessive wear between the cam surface 35 and the non-repeat mechanism.

An additional safety feature of the trip mechanism of the present invention is accomplished by providing an extension, step or shoulder 60 on the under or back side of the release lever 15. In the event any part is sprung or broken, for example, through careless maintenance or operation this step 60 will come into contact with the cam actuator 20 at 61. This will cause belt slippage on the flywheel 4 or stalling of the operating power, thereby avoiding possible accident and possible injury to the operator. This safety feature also operates in the event the bolt 10 is broken, which may be caused by overloading.

It is believed that the operation of the mechanism shown and described will be apparent from the foregoing description, and therefore the operation will not be repeated in further detail. Suffice it to emphasize that the mechanism may be set expeditiously and with facility to operate either non-repeat or continuous, as desired. The release lever is pivoted on the block 5 for swinging movement in a plane disposed transversely with respect to the axis of the crank shaft and about an axis parallel with the axis of the crankshaft. By travelling with the bolt 10 at all times, the lever 15 does not have to depend on the bolt 10 dropping back into position to retract it from the flywheel.

The embodiment of the invention shown in the drawings is for illustrative purposes only, and it is to be expressly understood that such drawings and the accompanying specification are not to be construed as a definition of the limits or scope of the invention, reference being had to the appended claims for that purpose.

I claim:

1. In mechanism of the class described, in combination, a rotatable driving member, a rotatable driven member, driving clutch means on said driving member, driven clutch means carried by said driven member, means urging said driven clutch means into engagement with said driving clutch means, a clutch releasing member carried by said driven member and operable to release said driven clutch means from said driving clutch means, said clutch releasing member comprising a lever pivoted to said driven member for swinging movement about an axis parallel with the axis of the driven member and in a plane disposed transversely with respect to said driven clutch means, and a cam actuator mounted for turning movement and adapted by its turning movement to force said clutch releasing member into cooperation with said driven clutch means to retract said driven clutch means from engagement with said driving clutch means, said cam actuator having a balance weight for turning it in a direction to retract said driven clutch means from engagement with said driving clutch means.

2. In mechanism of the class described, in combination, a rotatable driving member, a rotatable driven member, driving clutch means on said driving member, driven clutch means carried by said driven member, means urging said driven clutch means into engagement with said driving clutch means, a clutch releasing member carried by said driven member and operable to release said driven clutch means from said driving clutch means, a cam actuator mounted for turning movement and adapted by its turning movement to force said clutch releasing member into cooperation with said driven clutch means to retract said driven clutch means from engagement with said driving clutch means, and an abutment on said clutch releasing member for engagement with said cam actuator to cause stalling of the operating power in the event any part is sprung or broken.

3. In a mechanism of the class described, in combination, a rotatable driving member, a rotatable driven member, driving clutch means on said driving member, driven clutch means carried by said driven member, a clutch releasing member carried by said driven member, a cam actuator mounted for turning movement and adapted by its turning movement to force said clutch releasing member into cooperation with said driven clutch means to retract said driven clutch means from engagement with said driving clutch means, a cam surface on said driven member, and means including a part cooperable with said cam surface and operable to release said cam actuator for turning movement in a direction to actuate said clutch releasing member to retract said driven clutch means.

4. Mechanism according to claim 3 wherein the clutch releasing member has an abutment for engagement with said cam actuator to cause stalling of the operating power in the event any part is sprung or broken.

5. In mechanism of the class described, in combination, a rotatable driving member, a rotatable driven member, driving clutch means on said driving member, driven clutch means carried by said driven member, a clutch releasing member carried by said driven member and operable to release said driven clutch means from said driving clutch means, a ratchet member mounted for turning movement and having a cam actuator movable by turning movement of said ratchet member to position forcing said clutch releasing member into cooperation with said driven clutch means to retract said driven clutch means from engagement with said driving clutch means and to another position freeing said clutch releasing member for engagement of said driven clutch means with said driving clutch means, a cam surface on said driven member, a release member having swinging and generally endwise movement, toothed engagement between said release member and said ratchet member for turning said cam actuator to released position by generally endwise movement of said release member, and means on said release member cooperating with the cam surface on the driven member and operable to swing said release member to disengage the toothed engagement between the release member and the ratchet member for actuation of the driven clutch means to released position at the end of a cycle of operation.

6. Mechanism according to claim 5 wherein a foot pedal is connected to impart generally endwise movement to said release member and a guide plunger cooperates with said release member to bring the tooth on the release member into engagement with the tooth on the ratchet member when the foot pedal is released.

7. Mechanism according to claim 5 wherein said clutch releasing member has an abutment for engagement with said cam actuator to cause stalling of the operating power in the event any part is sprung or broken.

8. Mechanism according to claim 5 wherein said cam actuator has a balance weight for turning it to position to retract said driven clutch means from engagement with said driving clutch means.

9. In mechanism of the class described, in combination, a rotatable driving member, a rotatable driven member, a longitudinally shiftable bolt for drivingly connecting said members, means for actuating said bolt to released position and including a ratchet member mounted for turning movement, a release member mounted for swinging movement and generally endwise movement and adapted for toothed engagement with said ratchet member, manually operable means connected to impart generally endwise movement to said release member, a cam surface on said driven member, and means on said release member and cooperating with said cam surface for imparting swinging movement to said release member to free it from toothed engagement with said ratchet member.

10. Mechanism according to claim 9 wherein a guide plunger cooperates yieldingly with said release member to bring it into toothed engagement with the ratchet member.

KENNETH E. REESE.

REFERENCES CITED

The following references are of record in the file of this patent:

UNITED STATES PATENTS

| Number | Name | Date |
|---|---|---|
| 910,609 | Trog | Jan. 26, 1909 |
| 945,565 | Marshall | Jan. 4, 1910 |
| 978,351 | Bergman | Dec. 13, 1910 |
| 1,211,143 | Grothey | Jan. 2, 1917 |
| 2,204,421 | Loshbough | June 11, 1940 |
| 2,217,596 | Munschauer | Oct. 8, 1940 |
| 2,365,093 | Meyer | Dec. 12, 1944 |